UNITED STATES PATENT OFFICE 2,692,838

PROCESS FOR PRODUCING A SILICA COATING

Elmer A. Thurber, Murray Hill, N. J., assignor to Bell Telephone Laboratories, Incorporated, New York, N. Y., a corporation of New York No Drawing. Application May 26, 1951, Serial No. 228,527

6 Claims. (Cl. 117—102)

This invention relates to the production of colloidal hydrated silica solutions and more particularly to the production of such sols by the hydrolysis of organic silicates, or organic esters of a silicic acid.

This application is in part a continuation of my application Serial No. 597,971, filed June 6, 1945, now abandoned, and all rights, priorities and benefits thereby arising are claimed.

While colloidal hydrated silica solutions have been found to be useful for many purposes, they have been found to be particularly advantageous when employed as binding materials to hold finely divided particles of various materials in coatings on surfaces inside of envelopes of electron discharge tubes. Such particles may be formed of electron emission inhibiting materials and the coatings may be located on anode or grid surfaces where electron emission is undesired; or the particles may be formed of gettering material and the coatings may be located on anode or grid surfaces in the envelopes; or the particles may be formed of fluorescent materials and the coatings may be located on fluorescent screens in the envelopes; or the particles may be formed of other materials such as insulating materials and the coatings may be located on the surfaces of supports for the tube elements, or inner surfaces of the envelopes, or other surfaces in the envelopes.

In the preparation of such a coating, a layer of the finely divided particles in admixture with the colloidal hydrated silica solution is formed on the desired surface, and the liquid in the colloidal solution is evaporated. The residue of the solution is substantially silicon dioxide in polymerized form, which firmly binds the particles in place; because of its binding power, inert nature, and heat-resistance, it is highly advantageous as a binding agent.

It has been found advantageous to prepare solutions of colloidal hydrated silica suitable for these purposes by hydrolysis of organic silicates, such as ethyl or other alkyl silicates. In order to accelerate the hydrolysis and to promote the stability of such a colloidal hydrated silica solution it has been the practice to hydrolyze the ester in the presence of hydrochloric acid. Such acid is highly effective for this purpose. However, colloidal hydrated silica solutions prepared in this way often contain hydrochloric acid or chloride ions which may introduce substantial disadvantages when such colloidal hydrated silica solutions are employed as binders in forming coatings on surfaces disposed within the envelopes of electron discharge tubes.

Hydrochloric acid in a colloidal hydrated silica solution prepared in this way may react with the finely divided particles in the coating, particularly if they are particles of metal like zirconium, or it may react with the metal of grids, anodes or other parts to form metallic chlorides. Such chlorides of metals may and often do volatilize and react with electron emissive oxides of the cathode such as strontium and barium oxides to form chlorides, such as strontium and barium chlorides, which tend to poison the electron emissive oxides. Chloride ions in the silica binder may cause the same difficulties. Hydrochloric acid present in a colloidal hydrated silica binder in fluorescent tubes may react with zinc sulphide or other fluorescent materials and change them to non-fluorescent chlorides, thus impairing the fluorescent activity.

According to the present invention these difficulties are overcome by producing a colloidal solution of hydrated silica by hydrolyzing an organic silicate in the presence of formic acid. The process of the invention operates particularly well with alkyl silicates, such as ethyl silicate.

When the hydrolysis reaction is carried out in this manner the speed and completion of the reaction are promoted. A stable colloidal hydrated silica solution is produced which is free from hydrochloric acid or chloride ions which can cause the difficulties outlined above. Therefore, the solution may be employed to advantage as binding material in forming coatings on surfaces in the envelopes of electron discharge tubes as described above, and for other purposes. Any formic acid which might be retained in the colloidal hydrated silica solution would not be harmful. This acid would not react with the particles in the coatings or with the metal of the electrodes or their supports. Thus would be avoided the formation or deposition upon grids, anodes, or other parts of the discharge tubes of undesirable reaction products, such as chlorides which might cause poisoning of the oxides of the cathode or impairment of fluorescent activity in fluorescent tubes.

Excess formic acid remaining in the binding material may be readily removed when the tube is heated and evacuated during manufacture.

No other organic acids have been found which are as effective as formic acid in causing rapid hydrolysis of the organic silicate and in producing a stable colloidal hydrated silica solution. This acid appears to be unique in this respect.

The amount of water to be used in the hydrolysis reaction is important, since if too little water is used the hydrolysis reaction will be incomplete; but if too much water is used the colloidal hydrated silica solution will be too dilute, and the removal of the excess water would be troublesome and expensive. In general, it is advantageous to use two parts of water to five parts of organic silicate in the reaction mixture. Ordinarily, to insure complete reaction, at least one part of water to three parts of the organic silicate should be employed.

The amount of acid used in the reaction is important. If too little is used the hydrolysis may proceed at an undesirably slow rate, or the colloidal hydrated silica solution produced may be unstable. If too much acid is used, an excessive amount of unused acid may be retained by the colloidal hydrated silica solution, rendering the colloidal solution unsuitable for use as a binder in discharge tubes, since difficulties might be encountered in removing excess acid from the tube. Ordinarily it is desirable to use the acid in an amount constituting from about 0.2 per cent to about 2.0 per cent by weight of the organic silicate.

While the water and acid may be separately mixed with the organic silicate, an advantageous way of carrying out the present invention consists in hydrolyzing the organic silicate by treating it with an aqueous solution of formic acid.

If the colloidal hydrated silica solution is to be used as a binder in the envelope of an electron discharge tube, it is preferable to keep the limits of the concentration of the aqueous formic acid solution between about 0.1 normal and 1 normal, but if the colloidal hydrated silica solution is to be used in environments other than the envelopes of such tubes, the concentration of the aqueous formic acid solution may be between about 0.1 normal and about 5 normal. It is convenient to use a 0.5 normal aqueous solution of formic acid.

The organic silicate and the aqueous acid are immiscible, so there is added to the reaction mixture a solvent, such as ethyl alcohol or isopropanol, which can dissolve the organic silicate, the water, and the formic acid. Commonly available alcohols which are commercially feasible for use as solvents include the monohydric aliphatic alcohols containing up to four carbon atoms. The solvent acts to blend and intimately mix the two ordinarily immiscible liquids, and thereby accelerate the hydrolysis reaction. While the proportions of solvent employed may vary widely, if too much solvent is used, the end product is apt to be too dilute; and if too little is used, the reaction may proceed undesirably slowly. In general, it is undesirable to use enough solvent to dissolve the organic silicate and aqueous acid completely, since this may cause the end point of the hydrolysis to be masked; advantageously, enough solvent is used to cause emulsification of the organic silicate and aqueous acid. If ethyl alcohol is the solvent, it is preferable to use the ethyl alcohol in the concentration of one part of alcohol to two parts of the aqueous acid.

Reaction may also be accelerated by the addition of a small amount, as about 10 per cent, of a previously prepared colloidal hydrated silica solution. However, care should be taken not to add too much of this substance since undesirable crystallization of the end product might be promoted thereby.

The reaction may be carried out at any suitable temperature, as a temperature between room temperature and the boiling point of the organic silicate; in general the rate of the hydrolysis increases with increasing temperature. The reaction is usually complete in about one hour at room temperature; at 60 to 70° C. the reaction is complete in about five minutes.

Advantageously, the reaction mixture is agitated during the hydrolysis reaction. Since the organic silicate and the aqueous acid solution are immiscible at the beginning of the reaction, two phases are visible; when the mixture is agitated an emulsion is formed. When the reaction starts, the mixture begins to froth and foam and the temperature rises. The end of the reaction may be recognized by the disappearance of the two phases, and the formation of a clear water-white solution of colloidal hydrated silica.

Colloidal hydrated silica solutions prepared by hydrolyzing an organic silicate in the presence of formic acid as described above, in general are stable for at least about 100 hours.

The stability of the colloidal hydrated silica solution is affected by climatic conditions such as room temperature, and also by the pH of the solution. Solutions having a too high pH value usually gel abnormally rapidly.

The following example will serve to illustrate the invention:

*Example*

Five parts of ethyl silicate were mixed with a solution consisting of one part of ethyl alcohol and two parts of 0.5 N aqueous formic acid. The mixture was heated to 70° C. and stirred vigorously. An emulsion formed, and in a few minutes the mixture began to froth and foam, showing that the hydrolysis reaction was occurring. The reaction went rapidly to completion, leaving a clear, water-white solution of colloidal hydrated silica which was stable for about 100 hours.

A suitable method for employing the colloidal hydrated silica solution as a binder in making a coating containing metal or oxide particles on the surface of a member of an electron discharge tube comprises mixing the desired finely divided metal or oxide particles in a solution of colloidal hydrated silica prepared as described above, and then applying a coating of the resulting mixture to the surface of the member by spraying, dipping, or painting. The liquid is then evaporated from the coating, as by heating, leaving the finely divided metal or oxide particles firmly held by a binder of pure silica.

Another method involves forming a mixture of the finely divided particles, the organic silicate, water and formic acid in the desired proportions, and hydrolyzing the organic silicate in the presence of the particles to form the desired mixture of particles and solution of colloidal hydrated silica. This mixture can then be used to form a coating.

What is claimed is:

1. A process for producing a silica coating on a solid body comprising forming a colloidal hydrated silica solution by hydrolyzing an alkyl silicate in the presence of an acid hydrolyzing agent comprising a dilute aqueous solution of formic acid of a concentration between .1 normal and 1 normal, and a monohydric aliphatic alcohol containing up to 4 carbon atoms, subsequently applying said silica solution to the surface of the aforesaid solid body and heating said silica coated surface to remove any formic acid which may remain in said coating.

2. A process for forming, on the surface of an element of an electron discharge device, a coating which contains a silica binding agent and no objectionable acid residue, said process comprising hydrolyzing an alkyl silicate in the presence of water, an acid hydrolyzing agent consisting of formic acid and a monohydric aliphatic alcohol containing up to 4 carbon atoms, heating the resulting mixture to a temperature of from 60 to 70° C. to form a colloidal hydrated silica solution, coating the surface of said element with a composition comprising said colloidal silica solution, drying said solution, removing any remaining hydrolyzing acid from the coating by heating said element and subjecting to a vacuum.

3. A process for forming, on the surface of an element of an electron discharge device, a coating which contains a silica binding agent and no objectionable residue, said process comprising hydrolyzing an alkyl silicate in the presence of water, an acid hydrolyzing agent consisting of formic acid, and ethyl alcohol, subjecting the resulting mixture to agitation, heating the resulting mixture to a temperature of from 60 to 70° C., to form a colloidal hydrated silica solution, coating the surface of said element with a composition comprising said colloidal silica solution, drying said solution, and removing any remaining hydrolyzing acid from the coating by heating said element and subjecting to a vacuum.

4. A process for forming, on the surface of an element of an electron discharge device, a coating which contains a silica binding agent and no objectionable acid residue, said process comprising hydrolyzing an alkyl silicate in the presence of water, an acid hydrolyzing agent consisting of formic acid and a monohydric aliphatic alcohol containing up to 4 carbon atoms, to form a colloidal hydrated silica solution, said hydrolyzing agent being present in an amount between about .2 per cent and 2 per cent by weight of the alkyl silicate, coating the surface of the said element with a composition comprising said colloidal silica solution, drying said solution, and removing any remaining hydrolyzing acid from the coating by heating said element and subjecting to a vacuum.

5. A process as defined in claim 4 in which the monohydric aliphatic alcohol containing up to 4 carbon atoms is ethyl alcohol.

6. A process as defined in claim 4 in which the monohydric aliphatic alcohol containing up to 4 carbon atoms is isopropyl alcohol.

References Cited in the file of this patent

UNITED STATES PATENTS

| Number | Name | Date |
|---|---|---|
| 2,042,702 | Dreyfus | June 2, 1936 |
| 2,348,045 | Wooten | May 2, 1944 |
| 2,383,653 | Kirk | Aug. 28, 1945 |
| 2,399,981 | Britt | May 7, 1946 |
| 2,399,982 | Britt | May 7, 1946 |
| 2,432,484 | Moulton | Dec. 9, 1947 |
| 2,442,884 | Webb et al. | June 8, 1949 |
| 2,527,134 | Johnson | Oct. 24, 1950 |